United States Patent [19]

Floreancig

[11] Patent Number: 4,714,596
[45] Date of Patent: Dec. 22, 1987

[54] PROCESS FOR THE RECOVERY IN THE FORM OF TETRAVALENT FLUORIDE OF URANIUM EXTRACTED FROM PHOSPHATE-BEARING SOLUTIONS

[75] Inventor: Antoine Floreancig, Saint Genis Laval, France

[73] Assignee: Uranium Pechiney, Courbevoie, France

[21] Appl. No.: 795,410

[22] Filed: Nov. 6, 1985

[30] Foreign Application Priority Data

Nov. 16, 1984 [FR] France .................. 84 17993

[51] Int. Cl.⁴ .............................. C01G 43/06
[52] U.S. Cl. ......................... 423/10; 423/11
[58] Field of Search .................. 423/8, 10, 11

[56] References Cited

U.S. PATENT DOCUMENTS

| | | | |
|---|---|---|---|
| 2,830,872 | 4/1958 | McCullough | 423/10 |
| 2,841,467 | 7/1958 | McCullough | 423/10 |
| 2,866,680 | 12/1958 | Long | 423/10 |
| 2,873,166 | 2/1959 | Bowen | 423/10 |
| 2,947,774 | 8/1960 | Levine et al. | 423/10 |
| 4,207,294 | 6/1980 | Hirono | 423/11 |
| 4,316,877 | 2/1982 | Tunick et al. | 423/10 |
| 4,425,306 | 1/1984 | Weil et al. | 423/10 |
| 4,510,122 | 4/1985 | Floreancig | 423/8 |

OTHER PUBLICATIONS

Greek, *Ind. & Eng. Chem.*, 49, (#4), 628–638, (1957).

*Primary Examiner*—Edward A. Miller
*Attorney, Agent, or Firm*—Oblon, Fisher, Spivak, McClelland & Maier

[57] ABSTRACT

Uranium is recovered as $UF_4$ from phosphate solutions. The uranium is reduced to the tetravalent state and extracted with an organic extractant. The uranium is recovered as $UF_4$ by reextracting with an aqueous HF solution which includes $UF_4$ in suspension for improved reextraction.

15 Claims, 1 Drawing Figure

PROCESS FOR THE RECOVERY IN THE FORM OF TETRAVALENT FLUORIDE OF URANIUM EXTRACTED FROM PHOSPHATE-BEARING SOLUTIONS

BACKGROUND OF THE INVENTION

1. Field of the Invention

This invention relates to a process for the recovery in the form of tetravalent fluoride of uranium from an aqueous phosphate-bearing solution

2. Discussion of the Background

Phosphate-bearing solutions and in particular phosphoric acid which are produced by sulphuric attack on phosphate-bearing ores contain an amount of uranium which is generally from 0.040 to 0.200 g/l, depending on the origin of the ores.

Because of the high level of interest in uranium in the nuclear industry many processes have been developed for recovering that metal from such solutions.

Some of the processes involved consist of extracting uranium in hexavalent form by using organophosphorus solvents such as mixtures of di-2-ethylhexylphosphoric acid and trioctylphosphine oxide. This organophosphorous mixture is commonly referred to as di-2-EHPA+-TOPO, and is described for example in U.S. Pat. No. 3,711,951.

Other processes are based on extracting uranium in tetravalent form by using other organophosphorus solvents such as for example mixtures of mono- and dioctylphenylphosphoric acids. These processes are referred to as O.P.A.P. processes. When alkylpyrophosphoric acids such as octylpyrophosphoric acid are used, the process is referred to as the O.P.P.A. process. The O.P.A.P. process is disclosed in U.S. Pat. No. 3,835,214 and Belgian Pat. No. 870,346. The O.P.P.A. process is disclosed in U.S. Pat. No. 2,866,680.

When uranium is extracted in tetravalent form, a uranium-charged organophosphorus solvent is generally contacted with an aqueous solution hydrofluoric acid to extract the uranium via the formation of a suspension of $UF_4$ which can be recovered from the aqueous solution after separation of the solvent.

In order to achieve a suitable rate of reextraction, it is generally necessary to use a least a 15% by weight HF solution. However, the organophosphorus solvents degrade in the presence of such solutions. The degradation becomes increasingly severe as the concentration of HF is increased and contact time with the solvent is increased. In a process for the continuous extraction of uranium, it is therefore necessary to use a solvent composition which compensates for loss due to degradation. Thus, with the O.P.P.A. process it is the general practice to contiuously add at least 10 g of octylpyrophosphoric acid per litre of solution passing into the extraction battery.

There is thus a strongly felt need for an efficient process for the extraction of uranium in tetravalent form. Such a process would have to minimize costly material loss (solvent loss) during its operation as well as provide good yields of uranium.

SUMMARY OF THE INVENTION

Accordingly, it is an object of this invention to provide an efficient process for the recovery of uranium from a phosphate-bearing solution.

It is another object of this invention to provide a process for the recovery of uranium from a phosphate-bearing solution in which loss of material, such as solvent loss, is minimized.

It is another object of this invention to provide a process for the recovery of uranium from phosphate-bearing solution in which good yields of uranium as obtained.

It is another object of this invention to provide a process for the recovery of uranium from a phosphate-bearing solution in which loss of material, such as solvent loss, is minimized and good yields of uranium are obtained.

It is another object of this invention to provide a process for the recovery of uranium in its tetravalent form from a phosphate-bearing solution in which loss of material, such as solvent loss, is minimized and good yields of uranium are obtained.

The present inventors have now surprisingly discovered a uranium recovery process which satisfies all of the above objects. In this process the contact time between the hydrofluoric acid and the solvent is reduced, and the level of concentration of hydrofluoric acid used is decreased. This process minimized solvent degradation without adversely affecting uranium re-extraction yield. This process for the recovery of uranium contained in phosphate-bearing solutions comprises the following steps:

(a) reducting the uranium contained in the solution to the tetravalent state;

(b) extracting the uranium from the solution with an organic solvent belonging to the group formed by mixtures of mono- and dialkylphenylphosphoric acids and alkylpyrophosphoric acids, which are diluted in a hydrocarbon;

(c) re-extracting the uranium from the solvent with an aqueous solution of hydrofluoric acid, (d) separating the solvent from which the uranium has been removed from the emulsion formed in step (c), and recycling of the solvent to the extraction step with a make-up amount of pure solvent; and (e) recovery of the $UF_4$ from the aqueous suspension obtained in step (d).

This process is characterised in that $UF_4$ is introduced into the re-extraction solution used in step (c).

BRIEF DESCRIPTION OF THE DRAWINGS

A more complete appreciation of the invention and many of its attendant advantages will be readily obtained or the same becomes better understood by reference to the following detailed description when considered in connection with the accompanying FIGURE which shows a basic operating diagram in accordance with this invention.

DETAILED DESCRIPTION OF THE PREFERRED EMBODIMENTS

Figure 1:
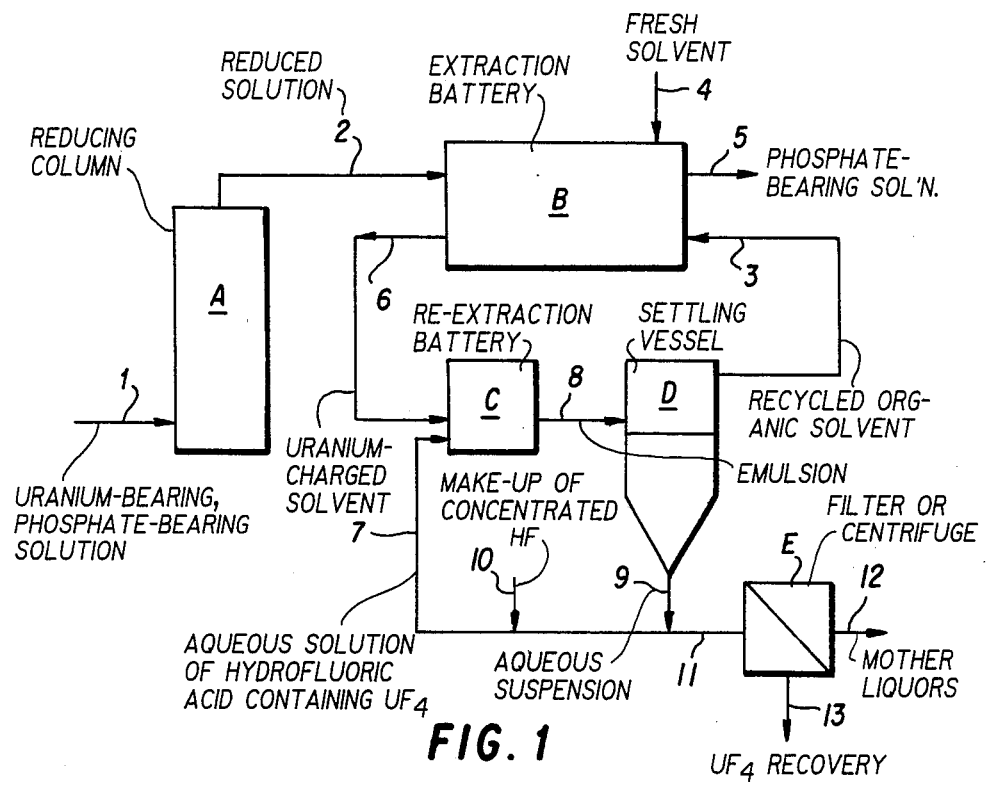

The invention is therefore distinguished from known processes in that the solution of hydrofluoric acid which is used for re-extraction of the uranium is not pure but contains particles of $UF_4$. That mode of operation is the result of the inventors' surprising observation that the presence of particles of $UF_4$ in the re-extraction solution made it possible to use less concentrated hydrofluoric acid and to reduce the contact time with the solvent without adversely affecting the uranium re-extraction yield. The inventors also observed that those particles had the effect of increasing the size of the grains of $UF_4$ which precipitate upon the addition of hydrofluoric acid. This result in easier recovery of $UF_4$ from the aqueous suspension obtained after separation of the solvent.

In their research, the inventors have found that the solution of hydrofluoric acid containing $UF_4$ could be formed by the aqueous solution which is obtained after separation of the solvent, provided that the concentration of HF is adjusted beforehand.

The present invention therefore relates to a system in which a fraction of the aqueous suspension obtained after separation of the solvent is subjected either to a filtration operation or a centrifuging operation to recover the $UF_4$. The other fraction is recycled to the re-extraction step after a make-up amount of hydrofluoric acid has been added. Recycling of the other fraction is effected in such a way as to maintain an amount of $UF_4$ in suspension between 5 and 300 g/l, preferably between 20 and 200 g/l. This is because an excessively low level of concentration provides only a partial result, and an excessively high level of concentration checks the increase in size of the grains of $UF_4$.

The concentration of HF in the recycled fraction is adjusted to a value of between 9 and 12% by weight by injecting into the recycling circuit a solution of HF which is concentrated to a value of 70% by weight for example.

The other steps in the process are carried out in the following manner:

Before extraction of the uranium, the phosphate-bearing solution resulting from the ore attack operation is subjected to the action of a reducing agent such as iron, for example. The purpose of this step is to adjust the uranium to a valency of 4. That operation uses either iron in powder form which is brought into contact with the solution in an agitated reactor, or plates (for example metal sheets) which are disposed in a column within which the solution is circulated.

The organic solvent used to extract the uranium from the phosphate-bearing solution is either a mixture of mono- and dialkylphenylphosphoric acids, preferably a mixture of mono- and dioctylphenylphosphoric acids, or alkylpyrophosphoric acids such as preferably decylpyrophosphoric acid or octylpyrophosphoric acid.

The alkylphosphoric acids used are those which have the best solvent capability with respect to tetravalent uranium. They are used diluted in an aliphatic and/or aromatic hydrocarbon. Aliphatic and aromatic solvents containing from 5 to 20 carbon atoms may be used.

The solvent which is charged with uranium in the extraction step is brought into contact with the reextraction hydrofluoric acid solution to form an emulsion. This emulsion is separated, on the one hand, into a solvent fraction from which uranium has been removed and which is recycled to the extraction step after the introduction of a make-up amount of fresh solvent corresponding to the amount which has been degraded by the acid. On the other hand, the emulsion is separated into an aqueous suspension fraction of $UF_4$ in the residual hydrofluoric acid or 'mother liquors'.

The re-extraction operation may be carried out at the same temperature as the extraction operation, that is to say, between 30° and 60° C. However it is advantageous, for the purposes of minimising solvent losses due to degradation, to operate at between 10° and 30° C. Recovery of the $UF_4$ from the suspension resulting from the re-extraction step is effected either by centrifuging or by settlement.

The invention will be better appreciated by referring now to the drawing, where like numerals designate identical or corresponding parts throughout. The uranium-bearing, phosphate-bearing solution 1 which results from the operation of attacking the ore with sulphuric acid is introduced into the reducing column A which is filled with iron plates. This gives a solution 2 which is referred to as 'reduced' and in which the uranium is in the tetravalent state. That solution is treated in counter-flow mode in an extraction battery B by a flow of recycled organic solvent 3 and a make-up of fresh solvent 4. This gives a phosphate-bearing solution 5 from which uranium has been removed, and a uranium-charged solvent flow 6.

The extraction battery B may be a battery of mixer-settling units, a pulsed or agitated extraction column, a battery of centrifuging extractors or a multi-stage centrifugal extractor.

The solvent 6 is passed into the re-extraction battery C which is also fed with a flow 7 of an aqueous solution of hydrofluoric acid containing $UF_4$ in suspension.

From C there issues an emulsion 8 which is passed into a settling vessel D which produces on the one hand the solvent 3 from which uranium has been removed and which is recycled to B and on the other hand the aqueous suspension 9 of $UF_4$ in hydrofluoric acid which is recycled in respect of a fraction thereof at 7 to B after having been restored to the required level of concentration in respect of HF by means of a make-up 10 of concentrated HF. The other fraction is filtered or centrifuged in E in order to recover the $UF_4$ at 13 and the mother liquors 12 which are possibly recycled to C.

Other features of the invention will become apparent in the course of the following description of exemplary embodiments whic are given for illustration of the invention and are not intended to be limiting thereof.

EXAMPLE 1

A technical solution of phosphoric acid containing 27.5% of $P_2O_5$ and 0.008% of uranium in tetravalent state was subjected to an extraction step using a solvent of kerosine R from Shell in which 30 g/l of octylpyrophosphoric acid (O.P.P.A.) was dissolved. That gave an extract containing 0.9 g/l of uranium which was divided into three fractions which were treated separately by a 15% by weight solution of hydrofluoric acid under the following conditions:

in accordance with the prior art, for the first, namely: pure HF in a ratio by volume of 0.1 with respect to the solvent, with pure HF and a ratio by volume of 1.2, in respect to the second, and with the same ratio in respect of the third, but adding particles in $UF_4$ in accordance with the invention.

For each of these fractions, the amounts of uranium remaining in the solvent after different reextraction periods were measured.

The conditions of the tests and the results are set out in Table I below.

TABLE I

| Test No. | Volume of U-charged solvent used in ml | HF solution Concentration % | Volume ml | Amount $UF_4$ g/l | U in the solvent in g/l Re-extraction period in minutes 0 | 1 | 5 |
|---|---|---|---|---|---|---|---|
| 1 | 500 | 15 | 50 | 0 | 0.900 | 0.250 | 0.055 |
| 2 | 500 | 15 | 600 | 0 | 0.900 | 0.155 | 0.035 |
| 3 | 500 | 15 | 600 | 150 | 0.900 | 0.045 | 0.033 |

The Table shows the influence of the presence of $UF_4$ on the rate of re-extraction of the uranium. Namely, after one minute of re-extraction, the amount of uranium remaning in the solvent is about three times smaller when operating in accordance with the invention. On that basis, for a given amount of uranium to be extracted, the period of contact of the solvent with the HF is shorter, hence giving a smaller amount of solvent degradation.

EXAMPLE 2

This Example uses the same solvent as that used in Example 1 but charged to a level of 1.100 g/l of uranium. The extract is divided into a plurality of fractions which are subjected to re-extraction under varying conditions in respect of concentration of HF and with or without $UF_4$, while the amount of uranium remaining in the solvent after different re-extraction periods was measured.

TABLE 2

| Re-extraction solution Concentration of HF in % by weight | Amount of $UF_4$ in g/l | U in the solvent in g/l Re-extraction period in minutes 0 | 0.5 | 5 | 10 |
|---|---|---|---|---|---|
| 9 | 0 | 1.100 | 0.350 | 0.290 | 0.230 |
|  | 50 | 1.100 | 0.175 | 0.140 | 0.130 |
|  | 150 | 1.100 | 0.140 | 0.120 | 0.110 |
| 12 | 0 | 1.100 | 0.260 | 0.165 |  |
|  | 50 | 1.110 | 0.120 | 0.080 |  |
|  | 150 | 1.100 | 0.080 | 0.050 |  |
| 15 | 0 | 1.100 | 0.200 | 0.080 |  |
|  | 50 | 1.100 | 0.080 | 0.055 |  |
|  | 150 | 1.100 | 0.060 | 0.045 |  |

The foregoing tests show that the addition of $UF_4$ makes it possible to reduce the concentration of HF in the re-extraction solution. This results in a reduction in degration of the organic solvent without adversely affecting the uranium re-extraction yield.

EXAMPLE 3

In this Example, the solvent which is a mixture of mono- and dioctylphenylphosphoric acids diluted in Shell kerosine R is charged with 0.8 g/l of tetravalent uranium. One fraction was treated in accordance with the prior art and the other was treated in accordance with the invention, using a solution of HF containing $UF_4$ in suspension corresponding to the flow 9 of a previous operation to which an additional amount of concentrated HF has been added.

The conditions under which the tests were carried out and the results are set forth in Table 3 below:

TABLE 3

| Re-extraction solution Concentration of HF in % by weight | Amount of $UF_4$ | U in the solvent in g/l Re-extraction on period in minutes 0 | 0.5 | 5 | 10 |
|---|---|---|---|---|---|
| 15 | 0 | 0.800 | 0.300 | 0.100 | 0.070 |
| 15 | 50 | 0.800 | 0.100 | 0.070 | 0.050 |

This Table shows that, by recycling a part of the suspension of $UF_4$ issuing from the re-extraction step, the period of contact of the hydrofluoric acid with the organic solvent is substantially reduced.

EXAMPLE 4

(The references indicated correspond to those used in the drawings.)

A phosphate-bearing solution 1 of the following composition in % by weight:

| $P_2O_5$ | 27.5 |
|---|---|
| $SO_4$ | 2 |
| F | 1.2 |
| Ca | 0.4 |
| U | 0.081 (i.e. 0.105 g/l) | was passed at a rate of 300 l/h through a column A filled with iron plates. After filtration of insoluble impurities, the solution 2 which is referred to as a 'reduced' solution was brought into contact in counterflow in a battery of mixing-settling units B with a flow of 20 l/h of solvent of a composition similar to that used in Example 1, coming from the settling unit D and still containing 0.05 g/l of uranium and a make-up 4 of 0.3 l/h of pure solvent containing 500 g/l of O.P.P.A. That is to say, the consumption was 150 g/h of O.P.P.A.

The phosphoric acid 5 from which uranium was removed, issuing from B, now contained only 0.006 g/l of uranium. That is to say, the extraction yield was 94.3%.

On issuing from B, the solvent 6 which was charged with 1.55 g/l of uranium was treated in C with 40 l/h of a recycled solution 7 of HF, in a proportion of 12% by weight, and containing 150 g/l of $UF_4$ coming from D and after the addition of a make-up amount at 10 of 70% by weight. The emulsion 8 issuing from C was separated in D into a flow of organic solvent 3 which was recycled to the extraction step and a suspension of $UF_4$ in HF(9), a part of which was recycled to C while the other part 11 was subjected to a filtration operation in order to separate $UF_4$ from the mother liquors. That procedure resulted in the recovery of 1200 g/h of a product with a moisture content of 37% and 25% of uranium.

That is to be compared to a test which was carried out in accordance with the prior art, using the same reactants, the same ore and the same flow rates. In this test it was found that on the one hand it was necessary to use a 15% solution of HF and a make-up amount of solvent of 300 g/h in order to provide an identical extraction yield. And on the other hand, the suspension 9 being unfilterable, it was necessary to have recourse to centrifuging in order finally to obtain a product which still contained 55% moisture.

It is thus possible to see the advantages of the present process which can be applied to all problems in regard to recovery of uranium in the form of $UF_4$ from phosphate-bearing solutions when there is a wish to reduce the period of contact between the hydrofluoric acid and the solvent and thus to reduce the level of consumption of the solvent without adversely affecting the uranium re-extraction yield, while enhancing the quality of the product obtained.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the recovery of uranium from a phosphate-bearing solution, comprising:
    (a) reducing the uranium in the phosphate-bearing solution to the tetravalent state;
    (b) extracting the said uranium from the said phosphate-bearing solution with an organic solvent comprising a hydrocarbon and either (b1) a mono- and a dialkylphenylphosphoric acid or (b2) an alkylpyrophosphoric acid;
    (c) re-extracting the uranium from the organic solvent by contacting the said organic solvent with an aqueous solution of hydrofluoric acid containing $UF_4$ as a suspension and present in an amount sufficient to enhance uranium extraction from the said organic solvent, to obtain an emulsion;
    (d) separating the organic solvent from which uranium has been removed from the emulsion formed in step (c) to obtain an aqueous suspension;
    (e) recycling the said organic solvent obtained from step (d) to extraction step (b) with a make-up amount of pure organic solvent; and
    (f) recovering $UF_4$ from the aqueous suspension obtained in step (d).

2. The process of claim 1, comprising using as a re-extraction solution, a solution from the recycling of at least a fraction of the suspension obtained in step (d) to which a make-up amount of hydrofluoric acid is added.

3. The process of claim 1, wherein the concentration of $UF_4$ in the suspenion is between 5 and 300 g/l.

4. The process of claim 3, wherein the concentration of $UF_4$ in the suspension is between 20 and 200 g/l.

5. The process of claim 1, wherein the concentration of hydrofluoric acid in the solution for treatment of the organic solvent is between 9 and 12% by weight.

6. The process of claim 1, comprising reextracting the uranium at a temperature of between 10° and 30° C.

7. The process of claim 1, wherein the organic solvent comprises a mixture of a mono- and a dioctylphenylphosphoric acid.

8. The process of claim 1, wherein the organic solvent comprises octyl- or decyl-pyrophosphoric acid.

9. A process for the recovery of uranium from a phosphate-bearing solution, comprising:
    (a) reducing the uranium contained in the phosphate-bearing solution to the tetravalent state;
    (b) extracting the said uranium from the said phosphate-bearing solution with an organic solvent comprising a hydrocarbon and either (b1) a mono- and a dialkylphenylphosphoric acid or (b2) an alkylpyrophosphoric acid;
    (c) re-extracting the uranium from the organic solvent by contacting the said organic solvent with an aqueous solution of hydrofluoric acid containing $UF_4$ as a suspension and present in an amount of between 5 and 300 g $l^{-1}$, to obtain an emulsion;
    (d) separating the organic solvent from which uranium has been removed from the emulsion formed in step (c) to obtain an aqueous suspension;
    (e) recycling the said organic solvent obtained from step (d) to extraction step (b) with a make-up amount of pure organic solvent; and
    (f) recovering $UF_4$ from the aqueous suspension obtained in step (d).

10. A process for the recovery of uranium from a phosphate-bearing solution, comprising:
    (a) reducing the uranium contained in the phosphate-bearing solution to the tetravalent state;
    (b) extracting the said uranium from the said phosphate-bearing solution with an organic solvent comprising a hydrocarbon and either (b1) a mono- and a dialkylphenylphosphoric acid or (b2) an alkylpyrophosphoric acid;
    (c) re-extracting the uranium from the organic solvent by contacting the said organic solvent with an aqueous solution of hydrofluoric acid having a hydrofluoric acid concentration of between 9 and 12%, and containing $UF_4$ as a suspension and present in an amount of between 5 and 300 g $l^{-1}$, to obtain an emulsion;
    (d) separating the organic solvent from which uranium has been removed from the emulsion formed in step (c) to obtain an aqueous suspension;
    (e) recycling the said organic solvent obtained from step (d) to extraction step (b) with a make-up amount of pure organic solvent; and
    (f) recovering $UF_4$ from the aqueous suspension obtained in step (d).

11. The process of claim 10, comprising using as a re-extraction solution, a solution from the recyling of at least a fraction of the suspension obtained in step (d) to which a make-up amount of hydrofluoric acid is added.

12. The process of claim 10, wherein the concentration of $UF_4$ in the suspension is between 20 and 200 g/l.

13. The process of claim 10, comprising reextracting the uranium at a temperature of between 10° and 30° C.

14. The process of claim 10, wherein the organic solvent comprises a mixture of a mono- and a dioctylphenylphosphoric acid.

15. The process of claim 10, wherein the organic solvent comprises octyl- or decyl-pyrophosphoric acid.

* * * * *